(12) United States Patent
Wheeler et al.

(10) Patent No.: US 10,337,647 B2
(45) Date of Patent: Jul. 2, 2019

(54) OBSTRUCTION DETECTION FOR A CONTROL VALVE

(71) Applicant: General Electric Company, Schenectady, NY (US)

(72) Inventors: Frederick Wilson Wheeler, Niskayuna, NY (US); Justin Scott Shriver, Newton, MA (US); Larry Gene Schoonover, Falmouth, MA (US); Brett Alexander Matthews, Albany, NY (US)

(73) Assignee: General Electric Company, Schenectady, NY (US)

(*) Notice: Subject to any disclaimer, the term of this patent is extended or adjusted under 35 U.S.C. 154(b) by 418 days.

(21) Appl. No.: 14/954,585

(22) Filed: Nov. 30, 2015

(65) Prior Publication Data

US 2016/0169410 A1 Jun. 16, 2016

Related U.S. Application Data

(60) Provisional application No. 62/091,911, filed on Dec. 15, 2014.

(51) Int. Cl.
*F16K 37/00* (2006.01)
*G05B 23/02* (2006.01)

(52) U.S. Cl.
CPC ...... *F16K 37/0041* (2013.01); *F16K 37/0083* (2013.01); *G05B 23/0205* (2013.01); *G05B 23/0235* (2013.01); *G05B 2219/33326* (2013.01)

(58) Field of Classification Search
CPC ............. F16K 37/0041; F16K 37/0083; G05B 23/0235; G05B 2219/33326
See application file for complete search history.

(56) References Cited

U.S. PATENT DOCUMENTS

| 5,329,465 | A | 7/1994 | Arcella et al. | |
|---|---|---|---|---|
| 5,573,032 | A * | 11/1996 | Lenz | G05D 7/005 137/486 |
| 5,748,469 | A | 5/1998 | Pyötsiä | |
| 6,272,401 | B1 * | 8/2001 | Boger | F15B 5/006 700/282 |
| 6,557,118 | B2 | 4/2003 | Schleiss et al. | |
| 7,089,086 | B2 | 8/2006 | Schoonover | |
| 7,290,450 | B2 | 11/2007 | Brown et al. | |
| 7,949,495 | B2 | 5/2011 | Wiklund et al. | |
| 8,356,207 | B2 | 1/2013 | Hosek et al. | |

(Continued)

*Primary Examiner* — Christopher E. Everett
(74) *Attorney, Agent, or Firm* — Baker Hughes Patent Operations

(57) ABSTRACT

A system receives a plurality of data samples associated with a control valve with each of the plurality of data samples associated with a setpoint and a position. A first subset of the data samples that are in a control zone associated with normal operation of the control valve is determined. In a case that a second subset of the data samples are determined to be (i) not in the first subset and (ii) close to a minimum position of the plurality of data samples and (iii) have setpoints less than their associated positions, an alert associated with a low obstruction is indicated. In a case that a second subset of the data samples are determined to be (i) not in the first subset and (ii) close to the maximum position of the plurality of data samples and (iii) have setpoint greater than their associated position, an alert is indicated.

17 Claims, 13 Drawing Sheets

(56) References Cited

U.S. PATENT DOCUMENTS

| | | | |
|---|---|---|---|
| 2004/0193327 A1 | 9/2004 | Yakushi | |
| 2008/0163936 A1* | 7/2008 | Boger | F15B 5/006 137/455 |
| 2009/0164050 A1* | 6/2009 | Ahmad | G01F 1/6847 700/282 |
| 2010/0305874 A1* | 12/2010 | Meier | F15B 19/00 702/34 |
| 2012/0139725 A1* | 6/2012 | Grumstrup | F16K 37/0083 340/540 |
| 2013/0019683 A1* | 1/2013 | Carder | F16K 37/0083 73/587 |
| 2013/0110418 A1 | 5/2013 | Nousiainen | |
| 2014/0303793 A1* | 10/2014 | Anderson | F16K 31/1262 700/282 |
| 2015/0107675 A1* | 4/2015 | Kucera | F16K 37/0033 137/1 |
| 2015/0142340 A1* | 5/2015 | Radomsky | F16K 31/1635 702/35 |
| 2015/0149100 A1* | 5/2015 | Eisenbeis | G01B 7/003 702/58 |
| 2015/0176722 A1 | 6/2015 | Prescott et al. | |
| 2015/0362090 A1* | 12/2015 | Anderson | F16K 37/0041 137/551 |
| 2016/0077531 A1* | 3/2016 | Kucera | F23N 1/002 137/2 |

\* cited by examiner

//OBSTRUCTION DETECTION FOR A CONTROL VALVE

BACKGROUND

A control valve is a valve that issued to control conditions such as flow, pressure, or temperature by opening or closing the control valve in response to signals received from a controller. The opening or closing of a control valve may be performed by electrical, hydraulic or pneumatic actuators.

If a control valve has an unintentional obstruction (e.g., a stuck stem or a mechanical blockage) and the obstruction is not corrected, the obstruction may cause a major disruption to an operation of a plant. Similarly, if an intentional obstruction (e.g., handwheel) is left in place beyond its intended use, the plant's operation may also be seriously disrupted. It is desirable to detect and correct obstructions, both unintentional and intentional. However, only if a plant operator knows that a control valve has an obstruction can adjustments be made or maintenance performed to correct a problem with the control valve.

BRIEF DESCRIPTION

According to some embodiments, a system may receive a plurality of data samples associated with a control valve. Each of the plurality of data samples may be associated with a setpoint and a position of the control valve at a time interval. A minimum position of the control valve may be determined based on the received plurality of data samples.

A control zone, comprising a fixed percentage of data samples that are greater than the minimum position, may be determined. A subset of the plurality of data samples that are not within the control zone are also determined. In a case that the subset of the plurality of data samples indicates an increase in a setpoint while a position of the control valve does not increase, an alert indicating a high obstruction may be transmitted. Similarly, in a case that the subset of the plurality of data samples indicates a decrease in a setpoint while a position of the control valve does not decrease, an alert indicating a low obstruction may be transmitted.

DETAILED DESCRIPTION

Figure 1:
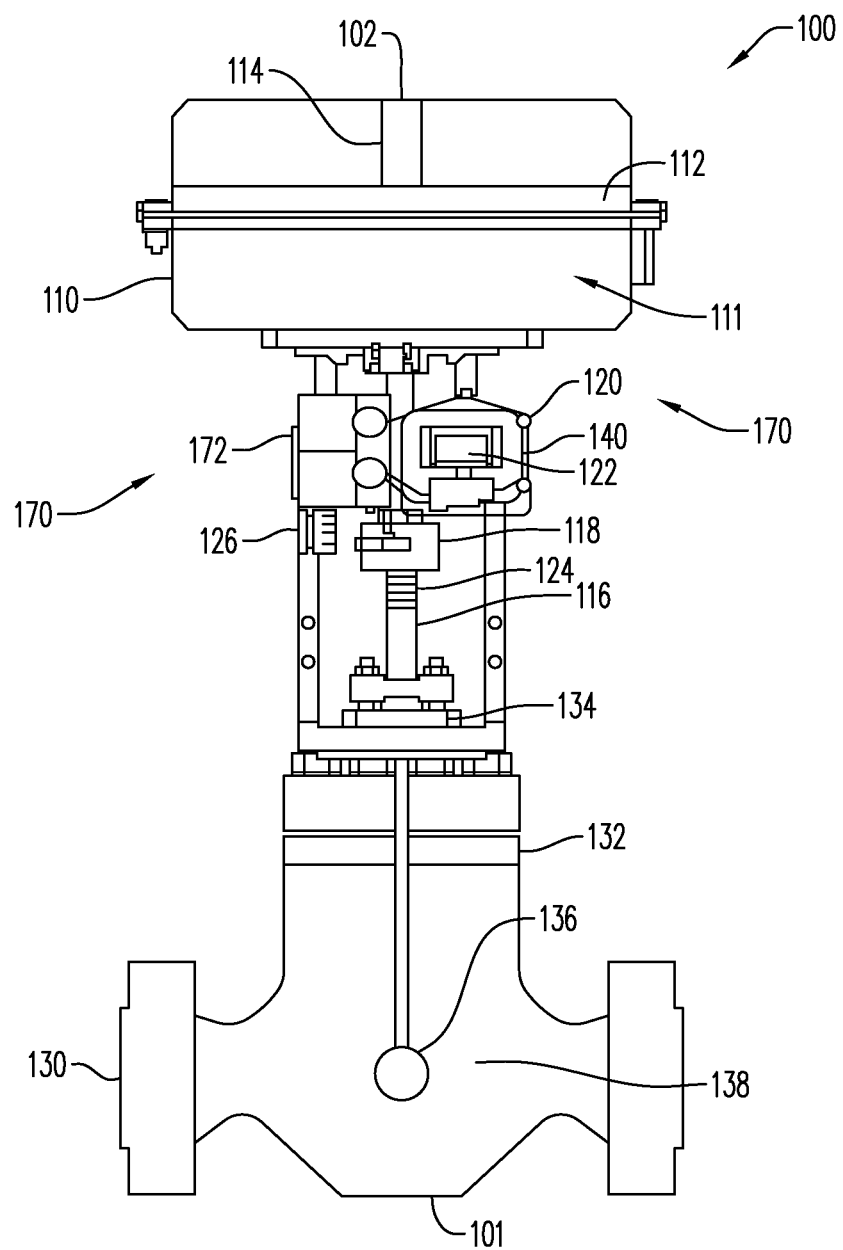
FIG. 1 is a diagram of a control valve according to some embodiments.

The following description is provided to enable any person in the art to make and use the described embodiments and sets forth the best mode contemplated for carrying out some embodiments. Various modifications, however, will remain readily apparent to those in the art.

The present embodiments relate a method and system to collect configuration information and operational data from control valves, detect obstructions in the control valves based on the operational data and report detected obstructions to plant operators. Since a control valve typically has a movable closure member such as a plug, ball or wafer that controls a flow of a fluid by changing a size of an opening, a control valve typically functions by moving a position of the closure member in a range from fully closed to fully open. The position of the closure member is generally denoted as a percentage, with 0% corresponding to fully closed and 100% corresponding to fully open. As used herein, the term "obstruction" refers to anything that restricts the travel of the movable closure member of the control valve. An obstruction may be intentional or unintentional. A low obstruction may prevent the movable closure member from moving below a certain position. A high obstruction may prevent the movable closure member from moving above a certain position.

Obstructions are sometimes called stops. For example, a handwheel stop may comprise a common intentional obstruction where a stop is put in place to prevent closure member travel above or below a certain position. This may be considered a temporary or permanent part of the overall valve control system. These intentional obstructions may be adjusted or eliminated using manual controls at the control valve itself.

An unintentional obstruction may be due to a mechanical blockage inside or outside of the control valve body, a seized movable closure member or buildup on the movable closure member or associated parts. For illustrative purposes, the normal ends of travel at actual position 0% and 100% are considered to be intentional obstructions. By treating the normal ends of travel as obstructions, a unified solution for valve obstruction detection may be obtained. Moreover, detection of calibration errors in the control valve's position sensing mechanism can also be accounted for where, for example, the actual position of 0% might result in a measured or recorded position of 4%. Calibration errors such as these may be corrected through a recalibration process.

One technical advantage of the present embodiments is to detect obstructions in a control valve and alert operators or control systems of the obstruction. The control systems to be alerted may be associated with control valves from any manufacturer because the present system communicates with the control valve using a standard protocol, such as Highway Addressable Remote Transducer ("HART") Communications Protocol or FOUNDATION fieldbus ("FF") communications system protocol.

Operational data may be collected from a control valve as it operates. In some embodiments, the data may be collected in real-time. However, the operational data may also be collected in batches which are periodically uploaded to a processing system. The operational data may comprise, but is not limited to, a desired setpoint (e.g., a desired or target position of a valve stem at a time interval), a position (e.g., a measured position of the valve stem at the time interval), and/or a valve pneumatic actuator pressure at the time interval. The aforementioned operational data may be collected using a VALVUE™ Online Valve Diagnostics or a VALVE AWARE™ system from General Electric Company or other valve monitoring systems and/or protocols.

Furthermore, the present embodiments relate to a novel method of determining a reason for an obstruction based on the received operational data. Reasons for an obstruction may comprise, but are not limited to, being fully closed, fully open, in manual mode or engaging a handwheel stop. The obstruction detection method disclosed herein may work with or without pressure data. For example, in one embodiment, if an obstruction is present it may be reported via a user interface or some other means, to a plant operator, for example, to take action so that the control valve may be adjusted or repaired if the obstruction is not intentional. Furthermore, a stop may be confirmed if the obstruction is intentional. In other embodiments, if an obstruction is determined to be present, a control system may be configured to automatically take action without user intervention.

Now referring to FIG. 1, an embodiment of a control valve assembly 100 is illustrated. Control valve assembly 100 may comprise an actuator 110, a positioner 120, and a valve 130. Actuator 110 may be configured to assist in converting energy formed by compressed air at high pressure into either linear or rotary motion. Actuator 110 may include an actuator chamber 111, diaphragm 112, a spring 114, an actuator stem 116, optional markings 124 and a first position sensor component 118 located on actuator stem 116. The positioner 120 may be configured to position actuator stem 116 to move further into or out of valve 130. The positioner 120 may comprise a positioner display 122, computing device 140, and may be in communication with a second position sensor component 126. The first position sensor component 118 may be coupled to actuator stem 116 such that the first position sensor component 118 may move as actuator stem 116 moves. The second position sensor component 126 may be fixed and coupled to a non-moving portion of the control valve assembly 100. In some embodiments, the second position sensor component 126 may comprise a potentiometer that is coupled to actuator stem 116 by a linkage (not shown). The control valve 130 may include a valve body 132. The control valve body 132 may comprise packing 134 contained within the control valve body 132 as well as a plug 136 and a seat 138.

The control valve assembly 100 may comprise a computing device 140, a bottom portion 101 located proximate to valve 130 and a top portion 102 located proximate to actuator 110.

Additionally, in the exemplary embodiment, a system 170 may comprise the positioner 120 coupled to a diagnostic component 172. In some embodiments, the diagnostic component 172 may be physically coupled to the positioner 120. Alternatively, the diagnostic component 172 may not be physically coupled to the positioner 120. However, in such alternative embodiments, the diagnostic component 172 may be wirelessly coupled to the positioner 120. System 170 may be configured to determine characteristics of valve assembly 100 as described further below.

Figure 2:
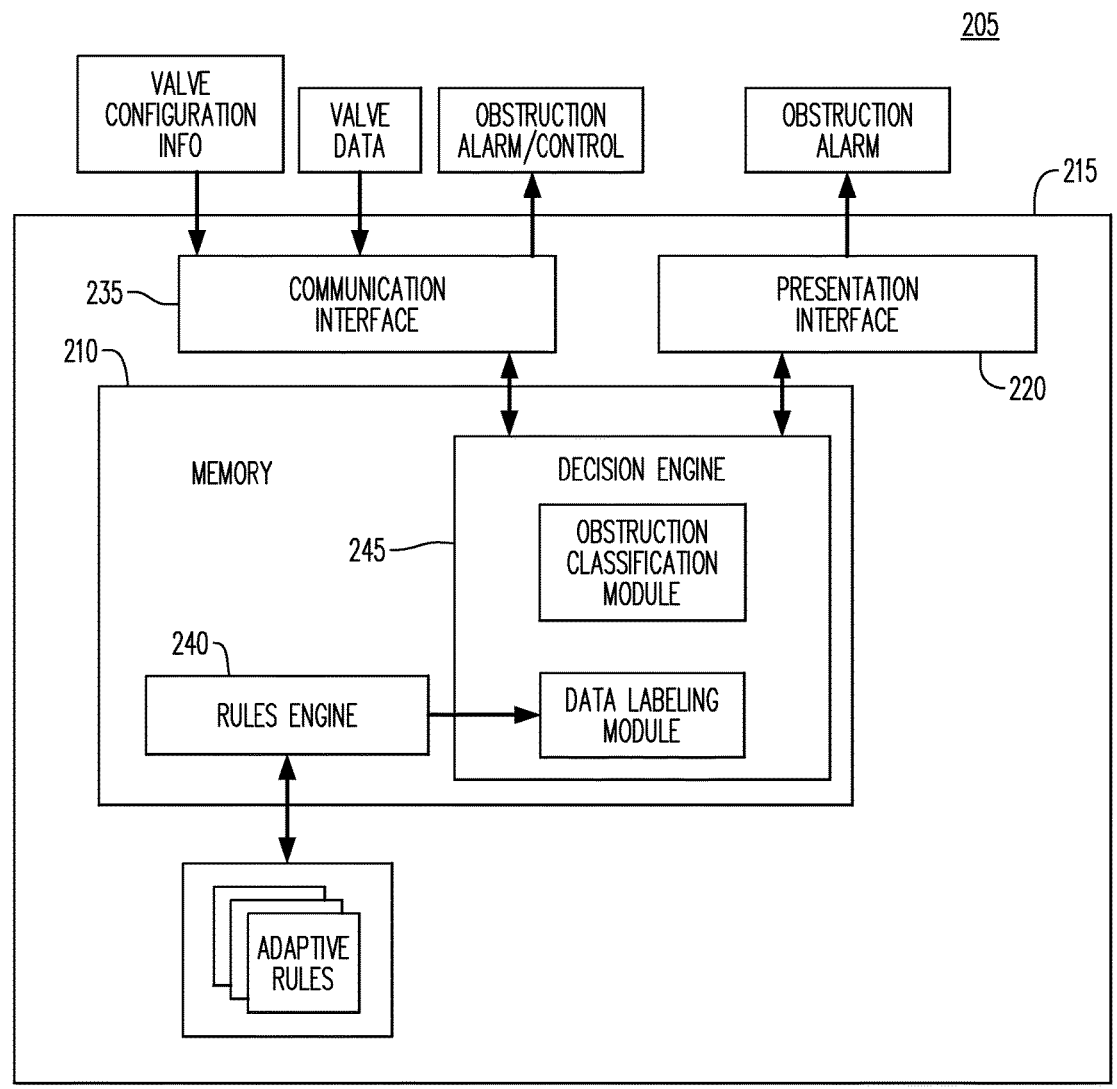
FIG. 2 is a block diagram of a control apparatus according to some embodiments.

In some embodiments diagnostic component 172 may be similar to a computing device such as the computing device described with respect to FIG. 2. In other embodiments, the diagnostic component 172 may comprise, without limitation, a desktop computer, a distributed control system (DCS), a PLC, a Supervisory Control and Data Acquisition (SCADA) system, or a hand-held device.

Valve assembly 100 may be used to control the flow of a process fluid by varying a size of an opening. Typically, the opening is located between plug 136 and seat 138, but other types of variable openings may be utilized, such as ball valves and gate valves. The plug 136 and the seat 138 may be internal to valve assembly 100 and may be in contact with the process fluid. Plug 136 may be moved by actuator 110, which may be pneumatic, hydraulic, or electric. The actuator 110 may move plug 136 via the actuator stem 116. Actuator stem 116 may extend from inside valve body 132 to inside actuator 110. To prevent process fluid from leaking past actuator stem 116, but to allow actuator stem 116 to move relative to valve body 132, there is a seal (e.g., packing 134 between actuator stem 116 and valve body 132).

FIG. 2 illustrates a block diagram of a computing device 205 that may be used to perform diagnostics for a control valve assembly according to some embodiments. Computing device 205 may monitor and/or control any one or more pieces of equipment, system, or process associated with the valve assembly 100, such as an actuator and a positioner as described with respect to FIG. 1. The computing device 205 may comprise memory 210, a communication interface 235, a presentation interface 220, and a processor 215.

The processor 215 may comprise a hardware processor that may be programmed by encoding an operation as one or more executable instructions and providing the executable instructions in memory device 210. In the exemplary embodiment, the memory device 210 may comprise one or more devices that enable storage and retrieval of information such as executable instructions and/or other data. The memory device 210 may include one or more non-transitory computer readable media.

The memory device 210 may be configured to store operational measurements including, without limitation, real-time and historical setpoints of an actuator stem, real-time and historical positions of an actuator stem, real-time and historical measurements of actuator pressure or force, real-time and historical measurements of pneumatic supply pressure, real-time and historical tight shutoff or tight open valve state, histograms of historical data, prior decisions and classification results from this system, data points associated with the control valve assembly, and acknowledgements made by a user as a response to alerts.

Also, the memory device 210 may include, without limitation, sufficient data, algorithms, and commands to facilitate monitoring or control of the components within a control valve assembly. In one embodiment, collected operational data may be processed in accordance with one or more rules to detect obstructions and to determine potential causes of the obstructions. In one embodiment, a series of rules may be used to determine valve conditions such as high control error, stick-slip cycling, tight shutoff and tight shutoff cycling.

In some embodiments, computing device 205 includes a presentation interface 220 coupled to the processor 215. The presentation interface 220 may present information to a user interface and/or an alarm. Additionally, the presentation interface 220 may interface with or be associated with one or more display devices. In some embodiments, presentation interface 220 may present an alarm associated with an actuator and/or positioner being monitored, such as by using a human machine interface (HMI) (not shown in FIG. 2). Also, in some embodiments, computing device 205 may include a user input interface such as, but not limited to, an interface for a keyboard, pointing device, or wireless controller (not shown). Such a user input interface may be coupled to processor 215 and receive input from a user.

A communication interface 235 may be coupled to processor 215 and may be configured to be coupled in communication with one or more other devices, such as a sensor or another computing device 205, and to perform input and output operations with respect to such devices while performing as an input channel. Communication interface 235 may receive data from and/or transmit data to one or more remote devices (e.g., control valve operational data, control valve configuration data, etc.). For example, a communication interface 235 of the computing device 205 may transmit an alarm to a communication interface 235 of another computing device 205.

The computing device 205 may also comprise a rules engine 240 and a decision engine 245. The rules engine 240 may store a series of rules that may be used to determine if an operational data point is related to an obstruction. The rules engine 240 may also store a series of rules that may be used to determine a reason for an obstruction. Based on the rules included in the rule engine 240, the decision engine 245 may label data points (via a data labeling module) and may classify obstructions (via an obstruction classification module).

Figure 3:
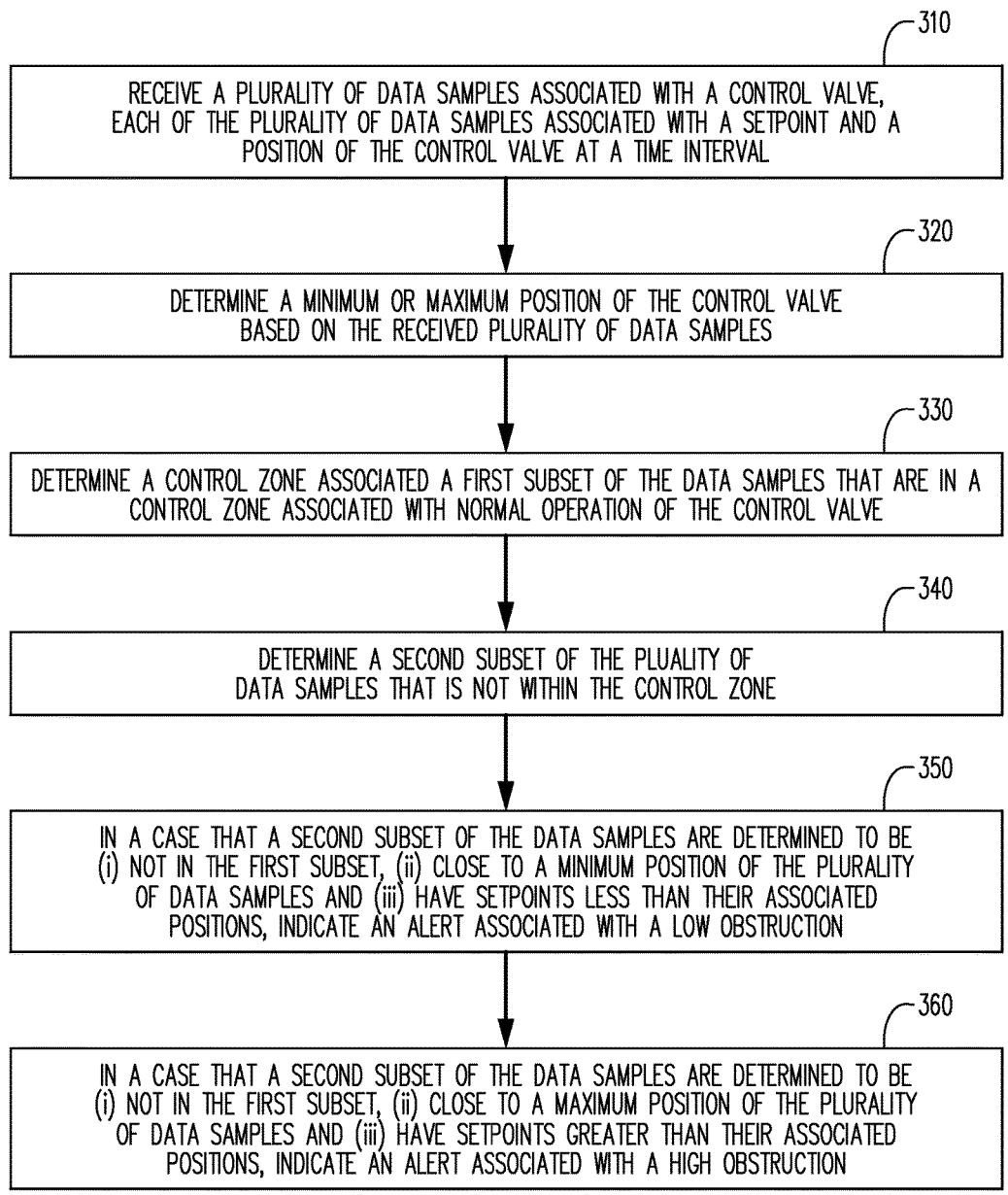
FIG. 3 is a diagram of a process according to some embodiments.

FIG. 3 comprises a flow diagram of process 300 according to some embodiments. In some embodiments, various hardware elements of system 200 may execute program code to perform process 300. Process 300, and all other processes mentioned herein, may be embodied in processor-executable program code read from one or more of non-transitory computer-readable media, such as a floppy disk, a CD-ROM, a DVD-ROM, a flash drive, and a magnetic tape, and then stored in a compressed, uncompiled and/or encrypted format. In some embodiments, hard-wired circuitry may be used in place of, or in combination with, program code for implementation of processes according to some embodiments.

Although process steps may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

In the following description, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Now referring to 310, a plurality of data samples associated with a control valve may be received. Each of the plurality of data samples may be associated with a setpoint and a position of the control valve at a time interval. A control valve may be monitored over a time period to sample both setpoints and positions at time intervals. In some embodiments, pressure may also be sampled at the time intervals. For example, sampling may be performed by repeatedly polling a control valve over a HART or FF network using commands that request setpoint, position and pressure. In some embodiments, the sampled setpoint, position and pressure may also be collected by a positioner attached to the control valve, or collected from a plant database, or by some other means.

In one embodiment, a data segment may be collected where the data segment comprises a fixed number of samples that are collected over a defined time period at a sample rate. For example, the data segment may comprise 120 samples for a 5 minute period at sample rate of about one sample every 2-4 seconds. The data segment may be collected while the control valve is in normal operation at a plant. Sampling the setpoint, position and pressure of the control valve may not affect control and operation of the control valve. The operational data associated with the data segment may be collected on a schedule or on demand such as a request from a user or from another system.

Other information associated with a control valve being sampled, such as its pneumatic supply pressure, whether the control valve is air-to-open (ATO), air-to-close (ATC) or has no spring, and whether the control valve is single-acting or double-acting, may be collected and used by the system and method described herein.

For illustrative purposes, and to aid in understanding features of the specification, an example will now be introduced. This example is not intended to limit the scope of the claims. The example relates to detecting a low obstruction on an ATO valve.

Figure 4:
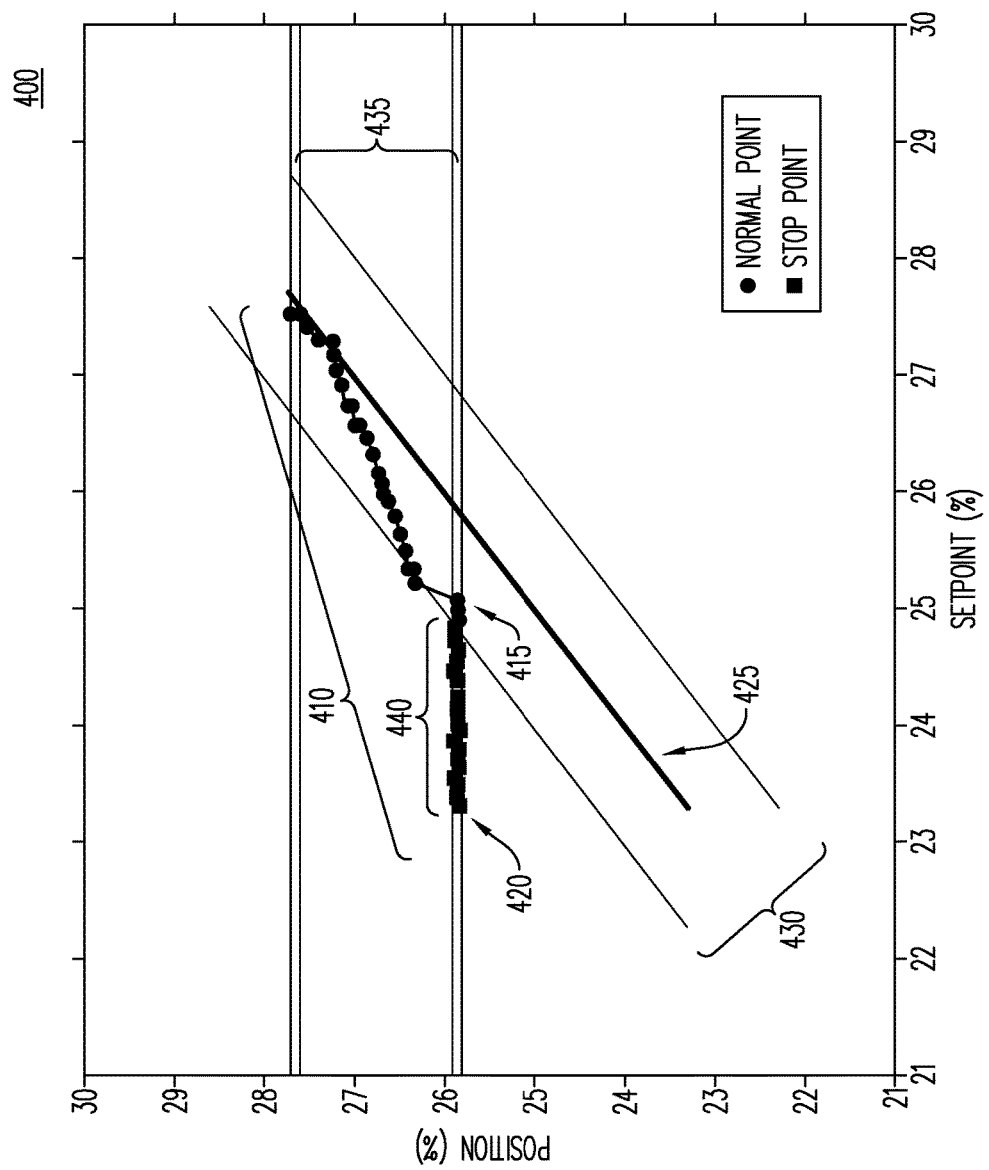
FIG. 4 is a graph illustrating a control valve setpoint vs. position according to some embodiments.

Continuing with the example, a plurality of data samples may be received where each of the plurality of data samples is associated with a setpoint and a position of an ATO control valve. Now referring to FIG. 4, an embodiment of a graph 400 is illustrated. The graph 400 may comprises a plurality of received samples 410 from a data segment. The plurality of received samples 410 are illustrated in a form of a graph 400 for explanation purposes. As illustrated, each sample may be graphed based on a sampled position vs. a sampled setpoint. In some embodiments, the graph 400 may illustrate a plurality of zones. In the present example, the plurality of zones is described for a case of detecting a low obstruction (e.g., a control valve is prevented from lowering its position). For high obstructions, similar symmetric zones may be implemented.

Referring back to FIG. 3, at 320, a minimum or maximum position value of the control valve may be determined based on the received plurality of data samples. The minimum position value of the control valve may comprise a lowest position of the control valve as determined from the plurality of data samples while a maximum position value of the control valve may comprise a highest position of the control valve as determined from the plurality of data samples. In some embodiments, determining a minimum positon value of the control value may be associated with a low obstruction and determining a maximum position value of the control valve may be associated with a high obstruction. Referring again to FIG. 4, in the exemplary embodiment, a lowest position may comprise point 415.

The lowest point 415 may indicate a minimum position while a small range of positions just above the minimum position in the data segment may define a border zone 420. If a control valve hits an obstruction, the associated plotted point will typically be in the border zone 420, however the control valve may also enter this zone when in control and not obstructed. The border zone width may be set to a constant. For example, a width of the border zone 420 may be typically 0.2%. The border zone 420 may be delimited by the minimum position and the minimum position plus the border zone width.

Now referring to 330, a control zone associated with the control valve may be determined. The control zone may comprise a fixed percentage of data samples that are greater than the minimum position. The control zone may comprise a first subset of the data samples that are associated with a normal operation of the control valve. The control zone may be determined by first determining a middle zone that can be defined as a region above the border zone and above a diagonal line 425 defined as x=y (e.g., setpoint equals position). Points in the middle zone may be collected and used to estimate a range of control error of the control valve when the control valve is not obstructed. An ideal control valve may comprise a 1:1 correspondence between position and setpoint, which is illustrated as the diagonal line 425. However, control valves in use are subject to forces such as pressure and flow and thus they may not operate as ideal control valves. As such, data points associated with control valves in use may not fall directly on the diagonal line 425. The degree to which the data points will deviate from the diagonal line varies from control valve to control valve, and may vary over time for single control valve.

Based on points in the middle zone, an approximate range of the normal control error for the control valve may be determined. For each of the data points in the middle zone, an error may be defined as the position minus the setpoint. If there are at least a threshold number of points (e.g., 10 points) in the middle zone, the control zone width 430 may be set to a fixed percentile (e.g., 90% percentile) of these control error values, but the control zone width should be at least 1.0%. If there is not the threshold number of points in the middle zone, the control zone width 430 may be set to 1.0%. The value of the control zone width 430 is done in this way such that the method adapts to the normal operating error for each particular control valve. The control zone may be defined as the region where a position is greater than the setpoint and the position is less than the setpoint plus the control zone width.

The control zone 435 may be delimited by the diagonal line 425 defined by setpoint equals position and a parallel lines above and below the diagonal line 425 which define the control zone width 430. In other words, the control zone 435 may be defined as a zone where a position-setpoint error is below a predetermined threshold and above zero. This threshold may result in the control zone comprising a fixed percentage of data samples where the data samples fall into a grouping of samples based on a percentile of the errors of the points in the middle zone. The grouping may be defined by the points above the border zone 420 and within the control zone width 430. In some embodiments, the control zone may comprise ninety percent of the data samples in the middle zone. The control zone may be assumed to be a normal range of operation of the control valve when it is not obstructed (and has positive error).

Now referring to 340, a second subset of the plurality of data samples that is not within the control zone is determined. The second subset of the plurality of data samples may be located in a stop zone 440. In a case of a low obstruction, the stop zone 440 may be defined as a portion of the border zone 420 that is not in the control zone. For example, when a control valve encounters an obstruction, and has high enough error, its setpoint and position will typically be in the stop zone 440. The stop zone 440 may not be within the control zone 435.

As a control valve is monitored over time, low and high obstructions may be detected and the reason for each obstruction may also be determined. Obstruction reasons may be determined based on the received operational data.

In some embodiments, after each data point of the operational data is processed, if 10% of the data points in a data segment, and at least a minimum threshold number of points (e.g., 5), are labeled as low (high) obstruction points, then a control valve may be declared to have an obstruction at the minimum position (maximum position). Note that it may be possible for a control valve to have both a low obstruction and a high obstruction and the aforementioned process will detect that special case.

In a case that the second subset of the plurality of data samples are determined to be (i) not in the control zone (ii) close to a minimum position of the plurality of data samples and (iii) have setpoints less than their associated positions, an alert associated with a low obstruction may be indicated at 350. As stated previously, FIG. 4 relates to a low obstruction which is illustrated as a setpoint decreasing while the position of the control valve remains in the stop zone 440.

Figure 5:
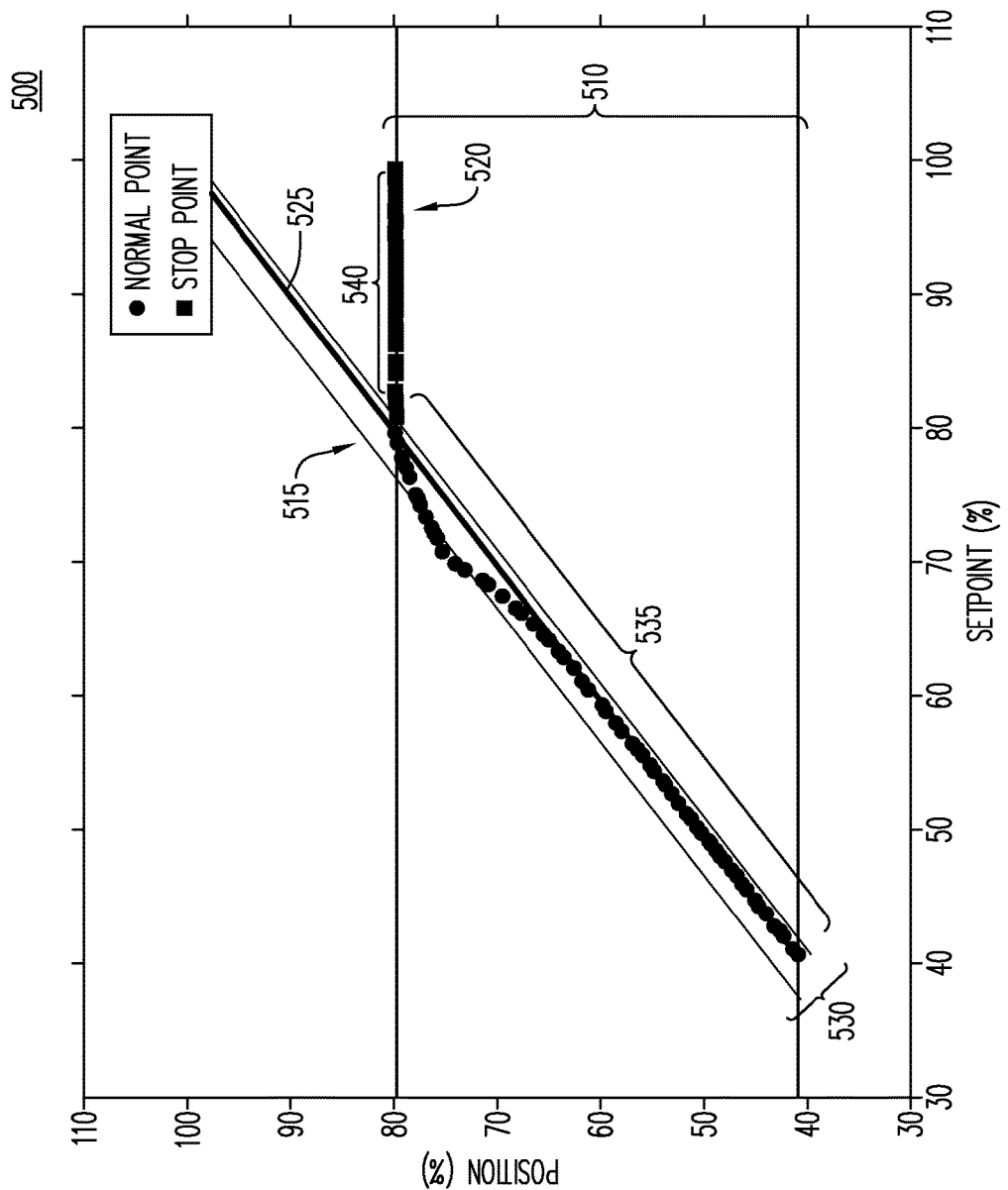
FIG. 5 is a graph illustrating a control valve setpoint vs. position according to some embodiments.

Similar to the process of detecting a low obstruction on an ATO valve, FIG. 5 relates to an analogous process for detecting a high obstruction on an ATO valve. Now referring to FIG. 5, an embodiment of a graph 500 is illustrated. The graph 500 may comprises a plurality of received samples 510 from a data segment which may indicate a high obstruction. In contrast to FIG. 4, FIG. 5 relates a setpoint increasing while a position of the control valve remains in a stop zone 540 (e.g., a high obstruction). As illustrated in FIG. 5, the graph 500 may comprises a plurality of received samples 510 from a data segment and from the received samples 510, a highest point 515 and a control zone 535 may be determined. The control zone may be determined by first determining a middle zone that may be defined as a region below a border zone 520 and above a diagonal line 525. The control zone 535 may be defined by a control zone width 530. A subset of the plurality of data samples 510 that is not within the control zone may be determined to be located in a stop zone 540 which, in this embodiment, may indicate a high obstruction. Referring back to FIG. 3, in a case that the second subset of the plurality of data samples are determined to be (i) not in the control zone, (ii) close to the maximum position of the plurality of data samples and (iii) have setpoint greater than their associated positions, an alert associated with a high obstruction may be indicated at 360.

In response to an obstruction, an alert may be raised and communicated to a user. In some embodiments, the alert may be communicated to one or more control systems. The alert may be communicated via a software interface, text message, email, or in any other manner.

Several methods may be used to generate and control the alerts. An alert may be generated every time an obstruction is detected. Alerts may be suppressed if a user has acknowledged an alert and indicated that no further alerts should be generated for that valve. Such a suppression may be set to last for a specified period of time and the suppression may be set to be enabled for a particular type of obstruction, low or high, or a particular cause of obstruction, such as manual mode, or tight shutoff, or a particular position value of the obstruction, or some combination of these criteria. If an obstruction is detected that does not match the suppression criteria then a new alert may be generated.

From the operational data, each data point may be considered in turn and may be labeled according to the rules described below (e.g., Rule 1, Rule 2, Rule 3, and Rule 4) to indicate if a data point is an obstruction point and, if so, label the data point with a reason for the obstruction. In some embodiments, each data point may comprise a single setpoint value, a single position value, and possibly a single pressure value. Thereafter, a final decision can be made about a control valve having an obstruction based on the labels assigned to the complete set of points in the data segment. In a case that the rules are applied in order, once one rule assigns a label or labels to a data point the remaining rules may be skipped. If a rule requires the pressure value, but the pressure value is not available, the rule may be skipped.

In some embodiments, if 10% of the data points, and at least a threshold number of points (e.g. 5) 5, are labeled as "tight shutoff" then the obstruction reason may be determined to be "tight shutoff". Similarly, if 10% of the data points, and at least a threshold number of points (e.g., 5), are labeled as "tight open" then the obstruction reason may be determined to be "tight open". If at least 50% of the data points are labeled as "manual mode", then the obstruction reason may be determined to be "manual mode".

In some embodiments, control valve positioners may provide additional status information about the state of the positioner, in addition to setpoint, position and pressure. If the positioner status indicates that tight shutoff is enabled, then Rule 1 may be automatically triggered so that a data point is labeled a low obstruction point and the data point is labeled with a reason of "tight shutoff". If the positioner status indicates that tight open is enabled, then Rule 1 can be automatically triggered so the point is labeled a high obstruction point and and the data point is labeled with a reason of "tight open". Rule 1 states that if a position is less than the minimum position plus the border zone width and pressure is less than a low pressure threshold and setpoint is less than 5.5%, a data point is labeled as a low obstruction point with a reason of "tight shutoff".

If the positioner status indicates that manual mode is enabled and position is less than minimum position plus the border zone width, then Rule 3 may be automatically triggered so that the data point is labeled a low obstruction point and the data point is labeled with a reason of "manual mode". If the positioner status indicates that manual mode is enabled and position is greater than minimum position plus the border zone width, then Rule 3 can be automatically triggered so that the data point is labeled as a high obstruction point and the data point is labeled with a reason of "manual mode". Rule 3 states that if a position is less than minimum position plus the border zone width and the pressure is greater than a low pressure threshold and the setpoint is between 5% and 95%, a data point is labeled as a low obstruction point with a reason of "manual mode".

Other rules that may be implemented are Rule 2 and Rule 4. Rule 2 states that if a position is less than minimum position plus the border zone width and pressure is less than a low pressure threshold, a data point may be labeled as a low obstruction point with a reason of "no pressure". Rule 4 states that if a position is less than minimum position plus the border zone width and position is greater than setpoint plus control zone width (e.g., in stop zone), a data point may be labeled as a low obstruction point with a reason of "obstruction".

The present method and system may also be used to determine calibration issues associated with a control valve, For example, if the control valve is declared to have a low obstruction and the minimum position is less than 5%, but not close to 0%, then the obstruction reason is declared to be "full close with calibration error". Similarly, if the control valve is declared to have a high obstruction and maximum position is greater than 95%, but not close to 100%, then the obstruction reason is declared to be "full open with calibration error".

Determining if an obstruction is present may be performed in a batch mode as described above or in a continuous fashion by buffering received operational data into data segments. The data segments may overlap in time. The aforementioned process may be executed on a valve positioner, a distributed control system, an asset management system, or any other connected system. Furthermore, the process may be implemented at any device where the data associated with the control valve is present. Results associated with the aforementioned process may be sent as summary information to any connected device. For example the process may be implemented directly on a positioner and the result of the obstruction detection process may be sent to a distributed control system, asset management system, or independent monitoring computer, where the independent monitoring computer may be a desktop computer or mobile device, for example.

In another embodiment, data may be received from a historian (e.g., a data historian), and send to an independent diagnostic computer. A historian may be connected to an asset management system or a distributed control system. A diagnostic computer may comprise the capabilities of a monitoring computer and the additional capability to run the obstruction detection method given the operational data. In another embodiment the operational data may be sent from the positioner by wires or wirelessly to a diagnostic computer. Note the data may be transmitted through intermediate devices such as a DCS or may be connected directly to the diagnostic computer.

Due to the vast number of control valves utilized in a given plant, the methods described herein may allow real-time and on-line valve obstruction detection heretofore not possible. The process described above analyzes operational data collected from a control valve over a relatively short period of time, usually minutes or hours. For each of these short periods a determination whether the control valve appears to have an obstruction may be made and, if so, a reason for the obstruction may also be determined A control valve may be monitored for a long period of time, such as for days, weeks, months or years, with data segments being recorded from the control valve at intervals, such as once per day. With such long term monitoring, data aggregation may add additional accuracy and insight.

One way to aggregate obstruction detection and classification is to plot the data over time. The plot may show the range of setpoint and range of position for each data segment. The plot may show icons indicating detected obstructions and possibly the obstruction classification. Such plots may make handwheel stops apparent, and may make abruptly or slowly changing calibration errors apparent.

Another way to aggregate obstruction detections is to filter out or remove detections that are not consistent over time. A low obstruction may be declared spurious if subsequent data segments have position data samples lower than the low obstruction position, or a subsequent data segment has a low obstruction at a significantly different position (lower or higher). Spurious obstructions may be eliminated, or may be rendered differently on a trend plot or display, or may have a reduced alert priority.

Figure 6:
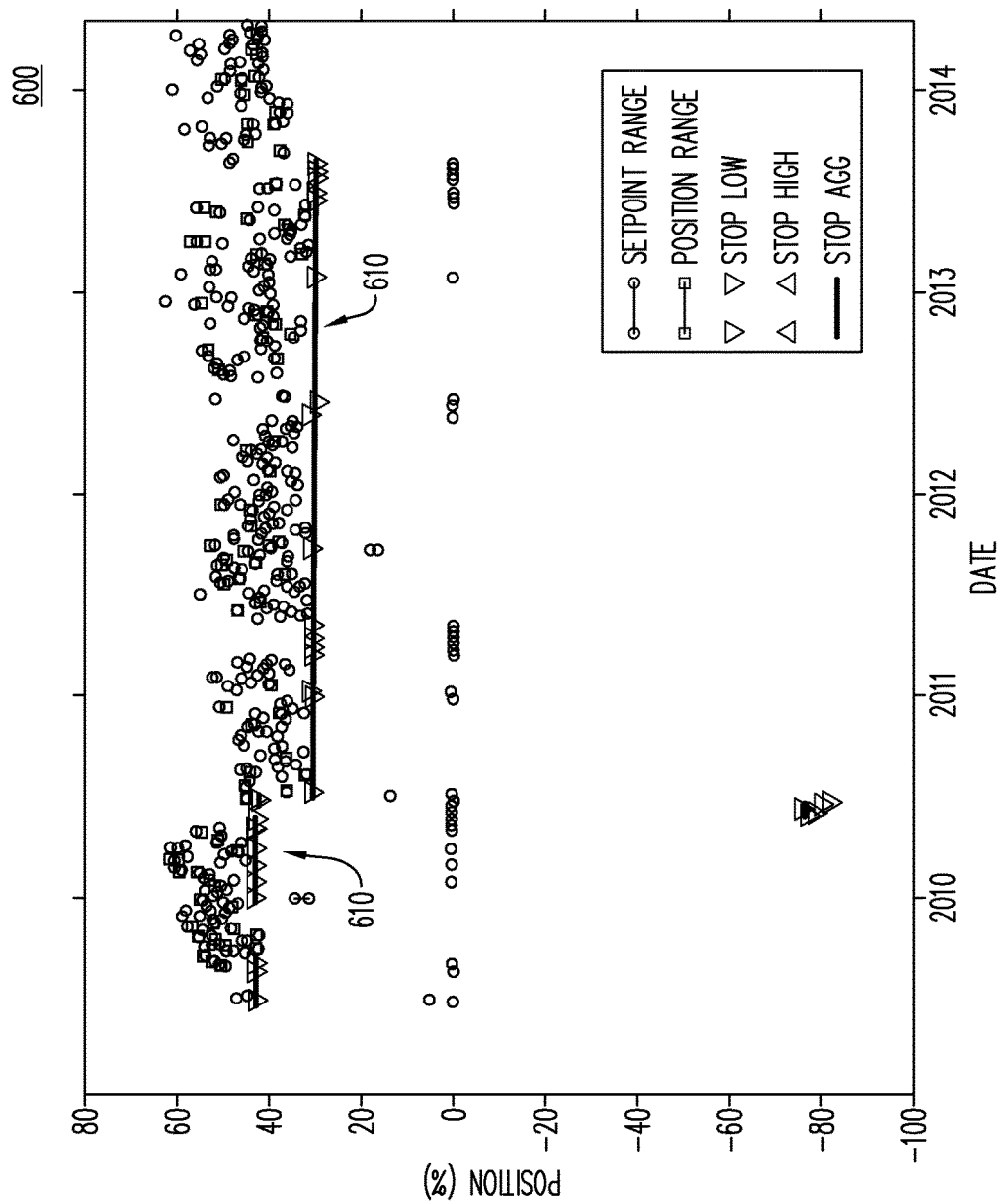
FIG. 6 is a graph illustrating a control valve setpoint, position and detected obstructions vs. a plurality of dates according to some embodiments.
Figure 7:
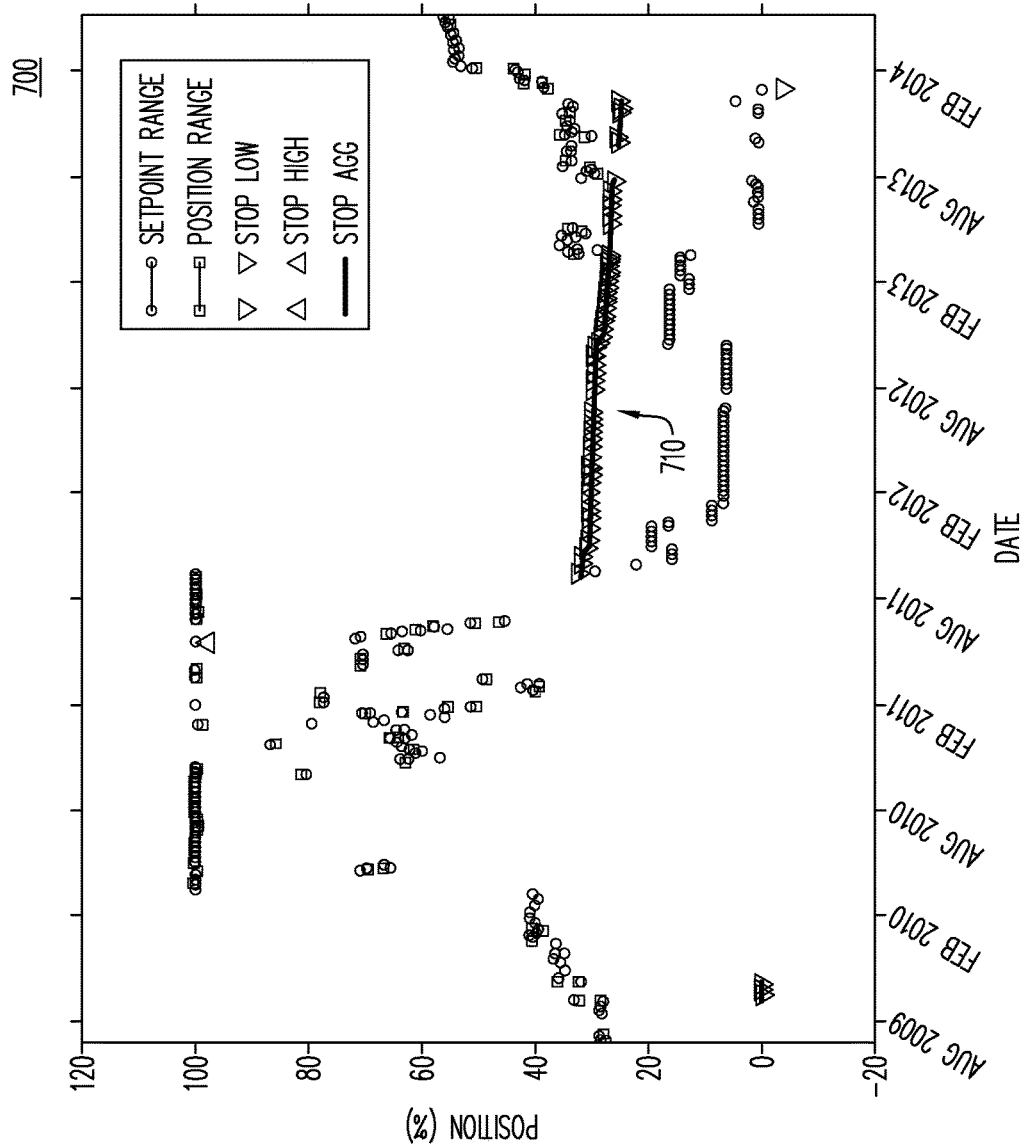
FIG. 7 is a graph illustrating a control valve setpoint, position and detected obstructions vs. a plurality of dates according to some embodiments.

FIG. 6 and FIG. 7 illustrate plots 600/700 of stop detection over time for two different control valves according to some embodiments. As illustrated in FIG. 6, a first low obstruction 610, likely from a handwheel, is consistent over time at two distinct positions. However, as illustrated in FIG. 7, a second low obstruction 710 has a slowly varying position.

The process 300 may also utilize pressure data points that are received. Even though an air-to-close valve assembly is discussed in detail below, it should be understood that air-to-open valve assemblies may also be used. Additionally, although a linear actuated valve assembly may be discussed in detail below, it should be understood that any valve assembly, including without limitation, rotationally actuated valve assemblies, ball valve assemblies, or any movable closure member assembly may also be used. While the present examples relate to describing the way in which a low obstruction is detected on an ATO valve, there are four separate situations that may be handled by the process: (1) a low obstruction on ATO valve might be a result of a tight shutoff, in which case, pressure is expected to be near the low extreme (2) a low obstruction on ATC valve might be a result of a tight shutoff, in which case, pressure is expected to be near the high extreme, (3) a high obstruction on an ATO valve might be a result of a tight open, in which case, pressure is expected to be near the high extreme and (4) a high obstruction on an ATC valve might be a result of a tight open, in which case, pressure expected to be near the low extreme.

Figure 8:
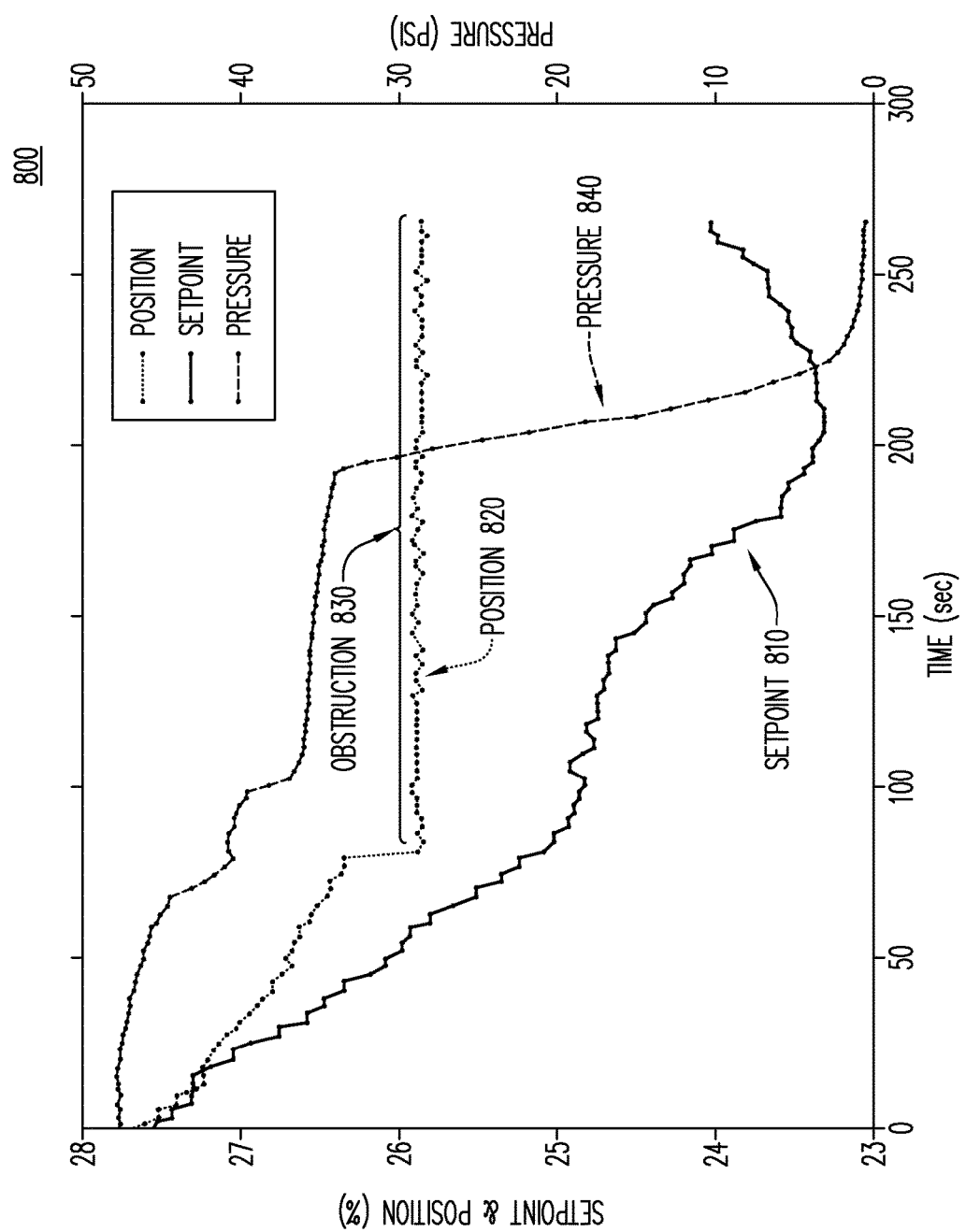
FIG. 8 is a graph illustrating a control valve's setpoint and position vs. time according to some embodiments.
Figure 9:
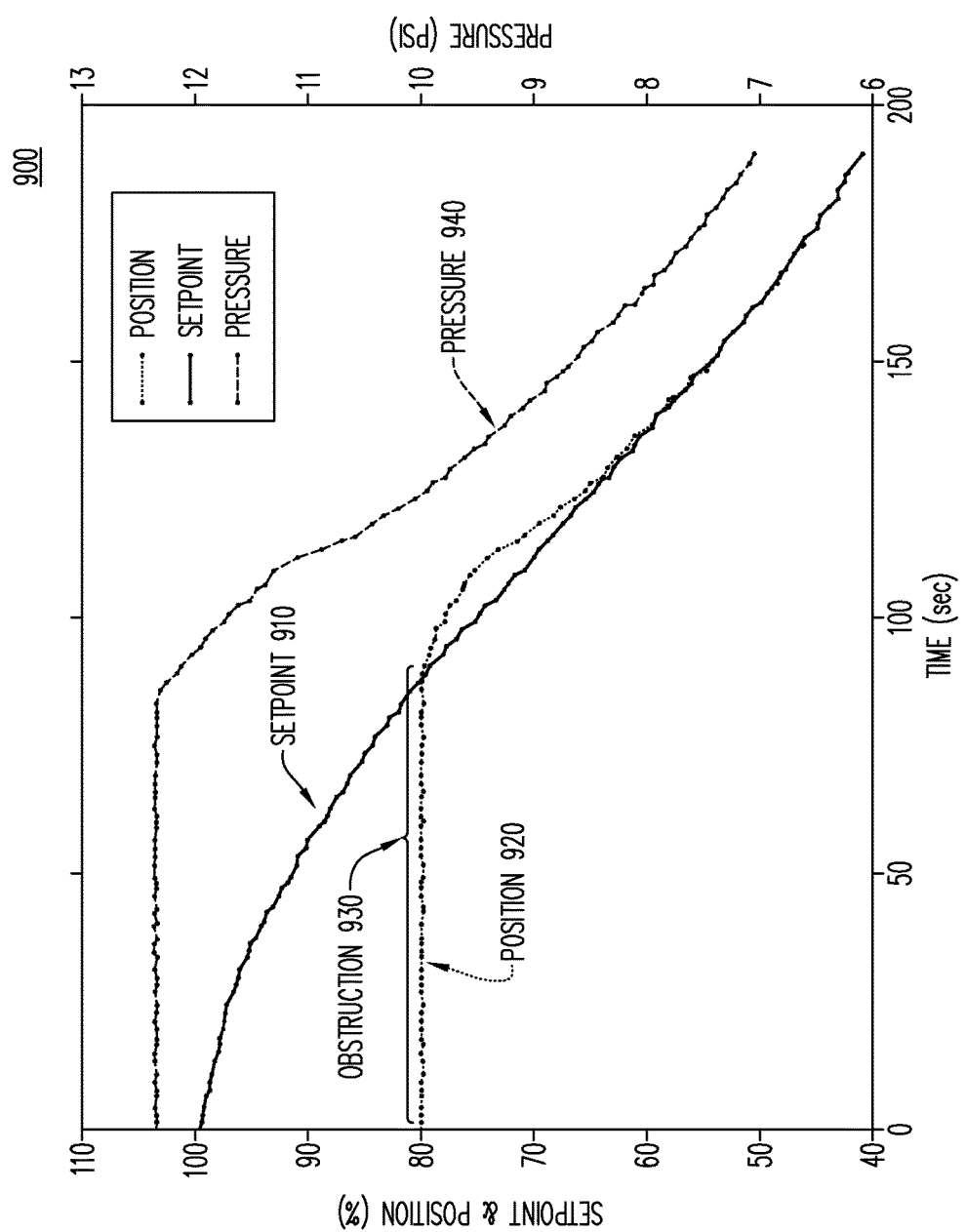
FIG. 9 is a graph illustrating a control valve's setpoint and position vs. time according to some embodiments.

For example, FIGS. 8 and 9 relate to graphs 800 and 900 that illustrate relationships between setpoint, position and pressure according to some embodiments. FIG. 8 relates to detection of a low obstruction. As illustrated in FIG. 8, as a setpoint 810 is decreased, a position 820 substantially tracks the decreased setpoint 810 until an obstruction 830 is reached. After the obstruction 830 is encountered, the position 820 stays substantially steady while the setpoint 810 continues to decrease. Similarly, pressure 840 substantially tracks the decrease in the setpoint 810 until obstruction 830 is reached. At this point the pressure 840 stays substantially steady until falling to zero.

FIG. 9 relates to detection of a high obstruction. As illustrated in FIG. 9, as a setpoint 910 is increased, a position 920 substantially tracks the increase in the setpoint 910 until an obstruction 930 is reached. After the obstruction 930 is encountered, the position 920 stays substantially steady while the setpoint 910 continues to increase. Similarly, pressure 940 substantially tracks the increase in the setpoint 910 until the obstruction 930 is reached. At this point, the pressure 940 stays substantially steady.

Figure 10:
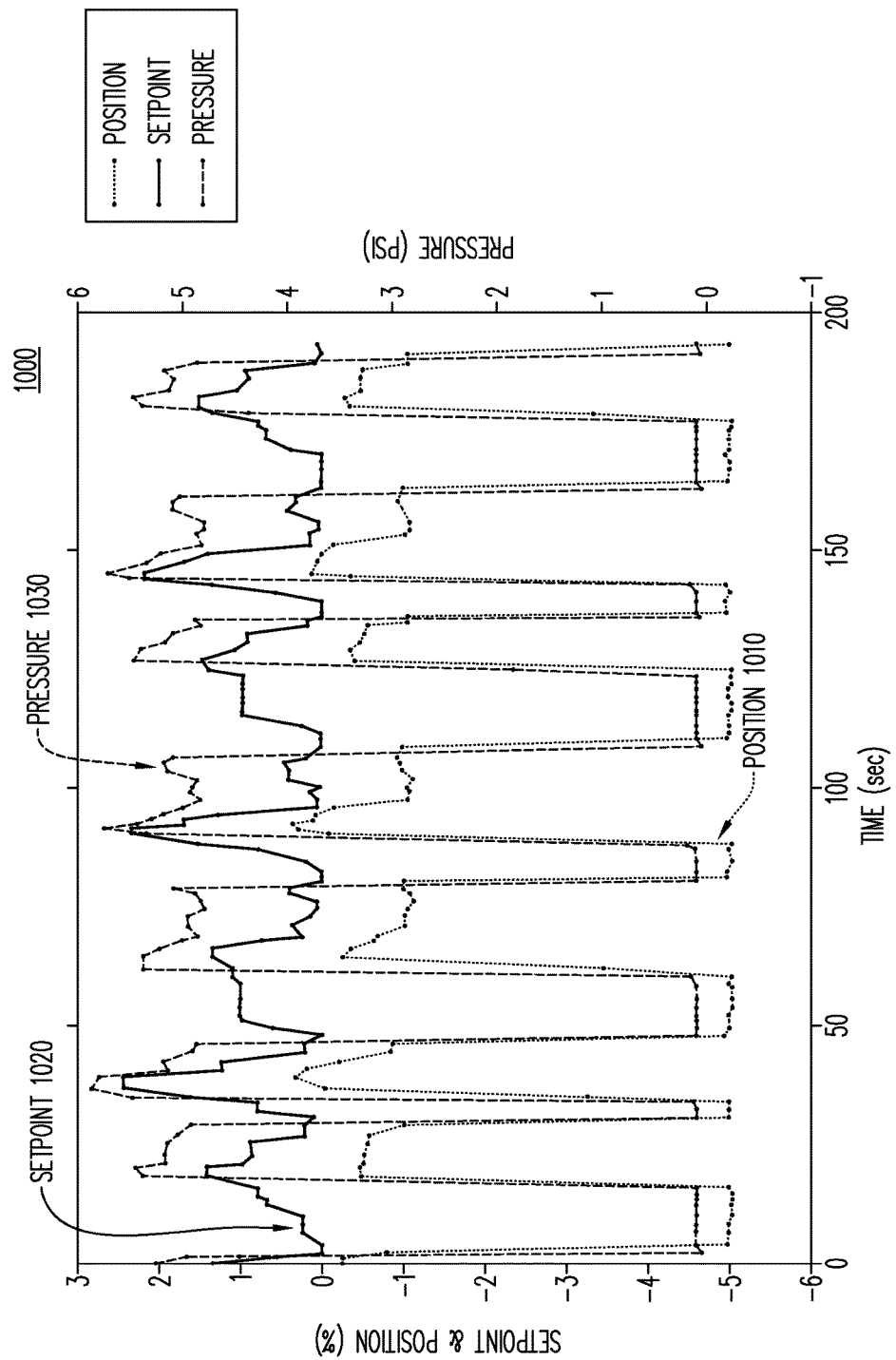
FIG. 10 is a graph illustrating a control valve's setpoint and position vs. time according to some embodiments.
Figure 11:
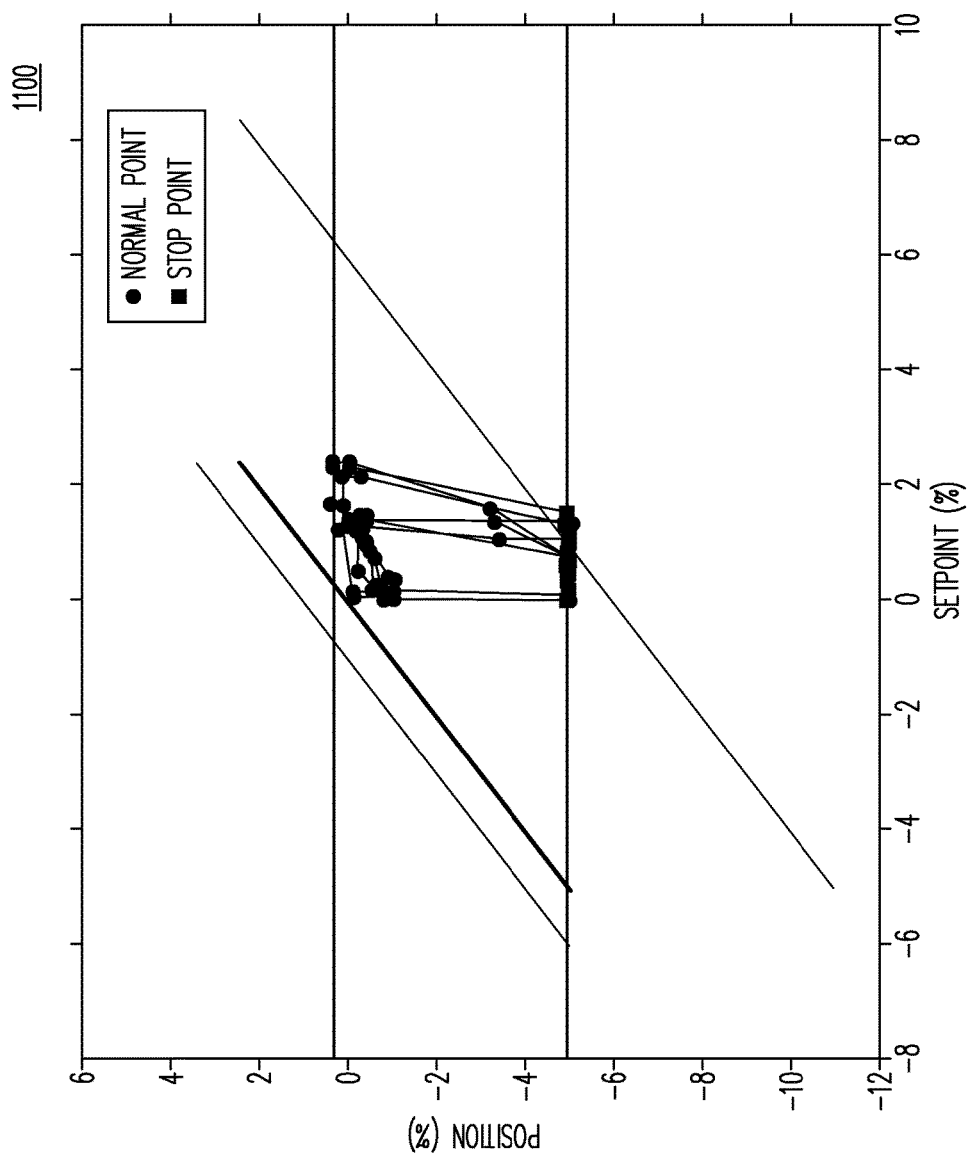
FIG. 11 is a graph illustrating a control valve setpoint vs. a control valve position according to some embodiments.

Now referring to FIG. 10 and FIG. 11, embodiments of graphs 1000 and 1100 are illustrated. Graphs 1000 and 1100 may relate to a low obstruction being engaged due to a tight shutoff feature. Many control valves have a feature known as tight shutoff (or tight open). When enabled, this feature may cause the control valve controller to completely and tightly close (or open) the control valve to position 0% (or 100%) when the commanded setpoint goes below (or above) a first threshold such as 2% (or 98%). Once the control valve is in tight shutoff (or open) it may only leave the tight shutoff (or open) if a commanded setpoint goes above (or below) a second threshold such as 3% (or 97%). The first and second thresholds may give the feature hysteresis. The purpose of tight shutoff is to protect the control valve from operation at positions near fully closed (or near fully open) which can cause the control valve to wear out faster because of the resulting high fluid velocity. As illustrated in FIG. 10, when a setpoint 1020 is between, for example, zero and 1.5%, the control valve has a position 1010 of −5% and the pressure 1030 associated with the control valve is indicted as being at zero. This illustrates that when a setpoint is in a specific range, the control valve may tightly shut. However, as illustrated in FIG. 10, when the setpoint advances past 1.5%, both the pressure and the position may increase to address the increase in the setpoint. Furthermore, FIG. 10 illustrates a calibration problem where a valve is tightly closed at −5% instead of 0%. This calibration issue may cause an alarm to be triggered so that the calibration may be addressed. FIG. 11 illustrates that in some embodiments, when a pressure is low, and still in a control zone, the data points may not be counted toward a low stop (or high stop).

Figure 12:
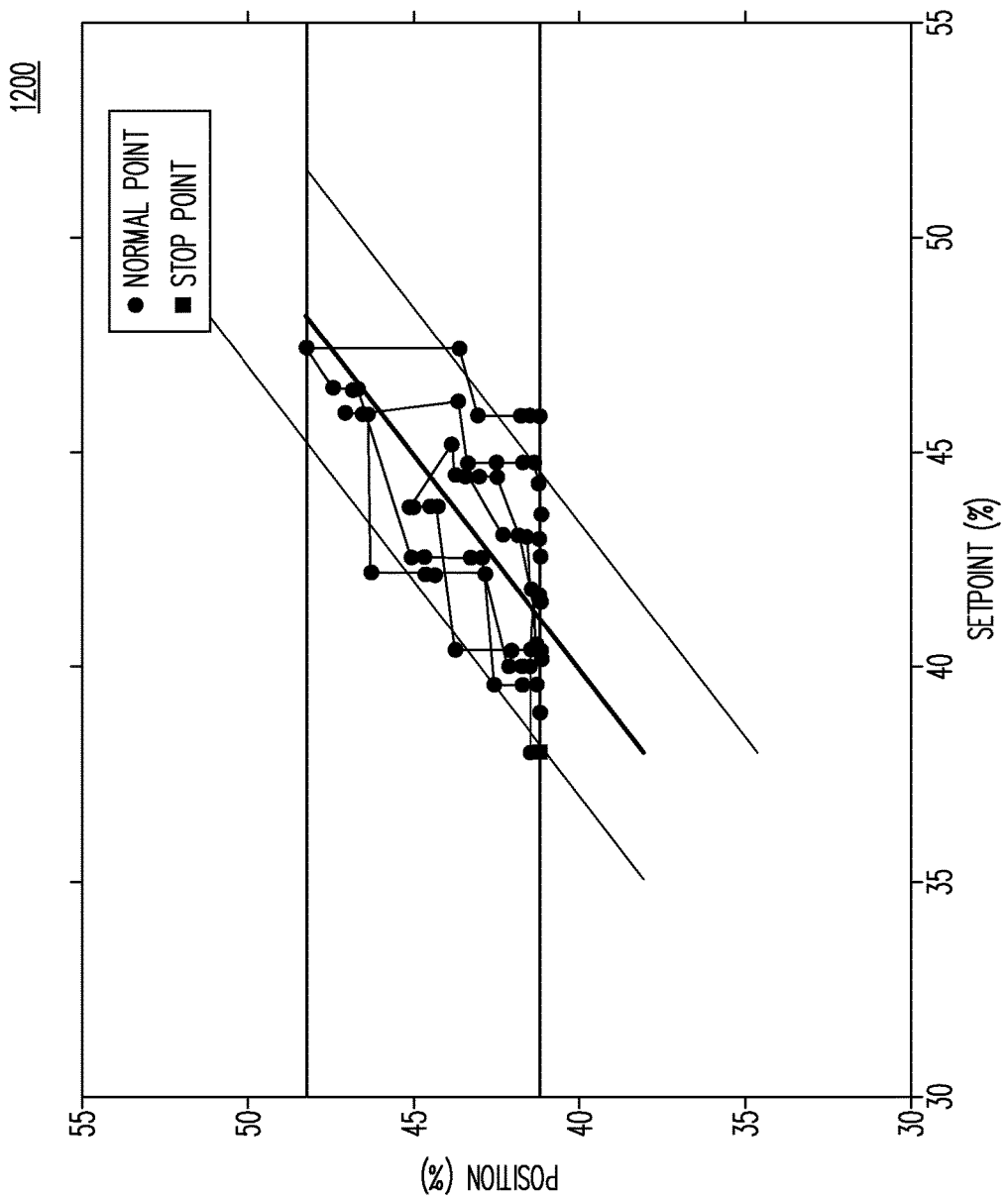
FIG. 12 is a graph illustrating a control valve setpoint vs. a control valve position according to some embodiments.
Figure 13:
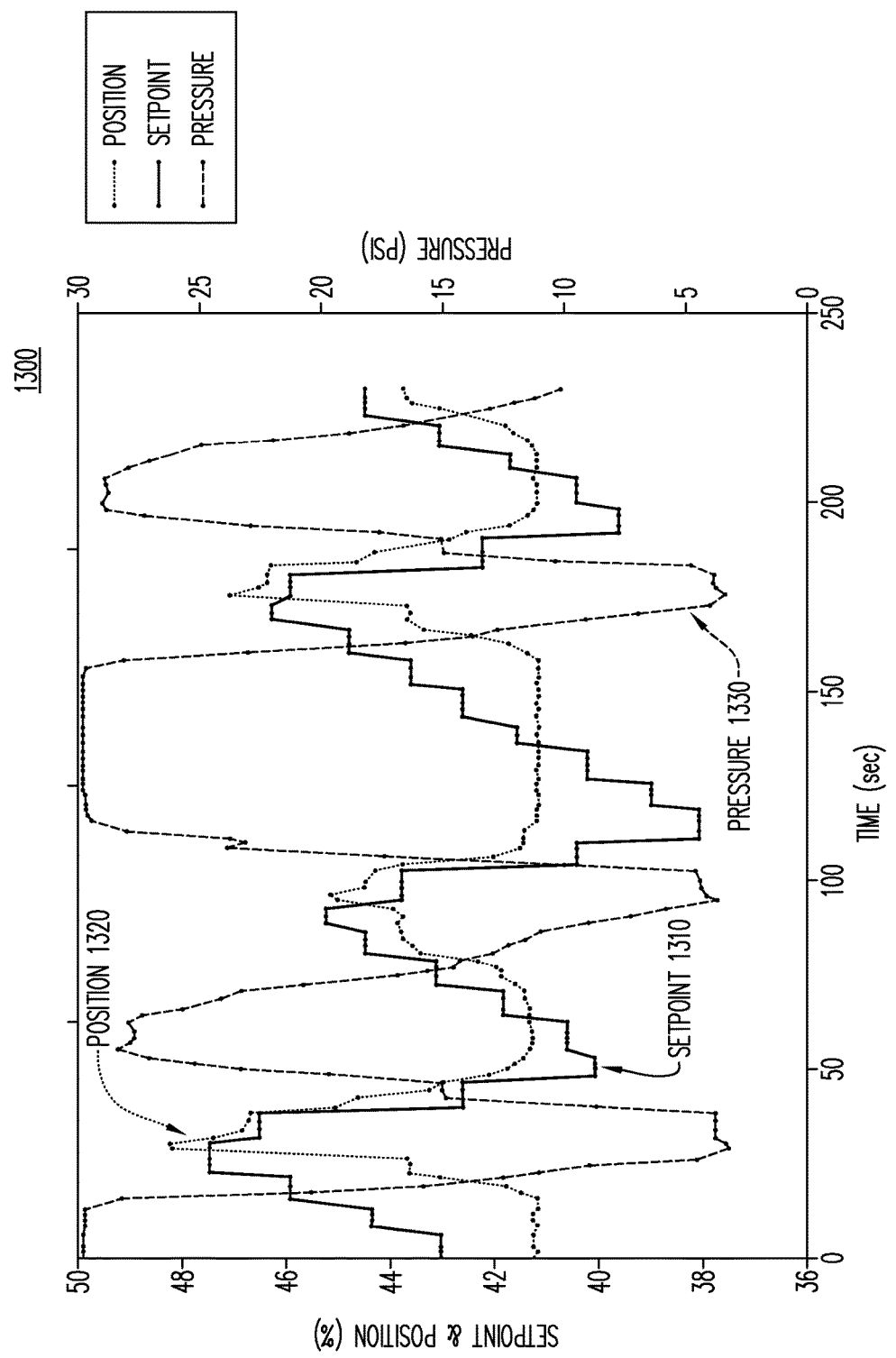
FIG. 13 is a graph illustrating a control valve's setpoint and position vs. time according to some embodiments.

Now referring to FIG. 12 and FIG. 13, embodiments of graphs 1200 and 1300 are illustrated. Graphs 1200 and 1300 may relate to stick-slipping. A control valve that is stick-slipping may experience a spontaneous jerking motion as fluid is being forced through the valve. This stick-slipping may be illustrated in FIG. 12 which illustrates operational data having a wider range of error as data points do not follow the diagonal line representing a 1:1 ratio of setpoint and position. The jerking nature of the setpoint 1310, position 1320 and pressure 1330 may be visualized in FIG. 13.

When pressure data is available, the obstruction detection method described above can optionally make use of knowledge of whether the control valve is single- or double-acting, the pneumatic supply pressure, control pressure extremes, and whether the control valve is air-to-open (ATO) or air-to-close (ATC). On an ATO valve, an increase in actuator pressure may increase the control valve position, or make the control valve more open. On ATC valve, an increase in actuator pressure may decrease the control valve position, or make the control valve more closed.

This information may typically be determined from a valve configuration process of the control valve monitoring system. However, this configuration information also may be determined from historical pressure data associated with the control valve (e.g., data that has been previously received from the control valve). The following example describes how to determine this configuration information from data collected from the control valve over time, which may typically consist of many data segments.

Whether a control valve is single or double-acting may be determined from a lowest historical pressure reading for the control valve. For valves that are double acting, the pneumatic pressure reported by a valve may be the pressure on one side of the actuator (P1) minus the pressure on the other side of the actuator (P2). The resulting value is called Pmain=P1−P2 and this value can be negative. If this value is below a threshold that is below 0.0 PSI by some margin (e.g., margin may be −1.0 PSI, −5.0 PSI, or −0.5 times the supply pressure, if known), then the control valve may be assumed to be double-acting.

The pneumatic supply pressure may be approximated sufficiently from the historical pressure data for the control valve by using the highest historical pressure value for the control valve if it is single-acting, or the highest absolute value of historical pressure if the control valve is double-acting. It may be desirable to ensure that this approximate supply pressure is at least some minimal reasonable value, such as 20.0 PSI, for example.

Whether the control valve is ATO or ATC may be determined by a regression line fit to the pressure and position data. If this line fit indicates that position increases with pressure then the control valve may be assumed to be ATO, otherwise it can be assumed to be ATC.

In some embodiments, low and high pressure thresholds may be set for the obstruction detection algorithm. It may be assumed that if a pressure is below the low threshold then the control valve may be at an obstruction (which may be at a designed end of travel). If the control valve is ATO, it may be assumed that the control valve will be as closed as the control valve can become and if the control valve is ATC the control valve will be as open as the control valve can become. Likewise, it will be assumed that if the pressure is above the high threshold then the control valve is at an obstruction (which may be at a designed end of travel). If the control valve is ATO the control valve will be as open as the control valve can become and the control valve the control valve is ATC the control valve will be as closed as the control valve can become.

In an exemplary embodiment, for a single-acting valve, the low pressure threshold may be set to 1.0 PSI and the high pressure threshold may be set to supply pressure less than 2.0 PSI. For a double-acting valve the low pressure threshold may be set to negative supply pressure plus 2.0 PSI and the high pressure threshold may be set to supply pressure less 2.0 PSI.

Embodiments described herein are solely for the purpose of illustration. Those skilled in the art will recognize other embodiments may be practiced with modifications and alterations to that described above.

What is claimed is:

1. A method comprising:
receiving a plurality of data samples associated with a particular control valve, the particular control valve including a valve stem;
each of the plurality of data samples associated with both a respective target setpoint and a respective measured position of the particular control valve stem;
each respective target setpoint and respective measured position of the plurality of data samples obtained at about a same respective time during a time period;
determining, via a processor, a first subset of the plurality of data samples that are in a control zone associated with normal operation of the particular control valve, the first subset determination based on a first distribution among the plurality of data samples for the particular control valve;
determining, via the processor, a second subset of the plurality of data samples for the particular control valve, the second subset being located in a low obstruction zone based on a second distribution among the plurality of data samples for the particular control valve, the second subset of the plurality of data samples having respective target setpoints less than their associated respective measured positions;
indicating a first alert associated with a low obstruction;
determining, via the processor, a third subset of the plurality of data samples for the particular control valve, the third subset being located in a high obstruction zone based on a third distribution among the plurality of data samples for the particular control valve, the second subset of the plurality of data samples having respective target setpoints less than their associated respective measured positions; and
indicating a second alert associated with a high obstruction.

2. The method of claim 1, wherein the control zone is associated with a position-setpoint error that is below a predetermined threshold and above zero.

3. The method of claim 1, wherein the particular control valve is an air-to-open control valve.

4. The method of claim 1, wherein the particular control valve is an air-to-close control valve.

5. The method of claim 1, wherein the received plurality of data samples are further associated with an air pressure.

6. The method of claim 5, further comprising:
  determining an obstruction reason based on the received plurality of data samples.

7. A system comprising:
  a computing device including a memory and a processor;
  the memory storing executable instructions that when executed by the processor cause the processor to:
  receive a plurality of data samples associated with a particular control valve, the particular control valve including a valve stem;
  each of the plurality of data samples associated with both a respective target setpoint and a respective measured position of the particular control valve stem;
  each respective target setpoint and respective measured position of the plurality of data samples obtained at about a same respective time during a time period;
  determine a first subset of the plurality of data samples that are in a control zone associated with normal operation of the particular control valve, the first subset determination based on a first distribution among the plurality of data samples for the particular control valve;
  determine a second subset of the plurality of data samples for the particular control valve, the second subset being located in a low obstruction zone based on a second distribution among the plurality of data samples for the particular control valve, the second subset of the plurality of data samples having respective target setpoints less than their associated respective measured positions;
  indicate a first alert associated with a low obstruction;
  determine, via the processor, a third subset of the plurality of data samples for the particular control valve, the third subset being located in a high obstruction zone based on a third distribution among the plurality of data samples for the particular control valve, the second subset of the plurality of data samples having respective target setpoints less than their associated respective measured positions; and
  indicate a second alert associated with a high obstruction.

8. The system of claim 7, wherein the control zone is associated with a position-setpoint error that is below a predetermined threshold and above zero.

9. The system of claim 7, wherein the particular control valve is an air-to-open control valve.

10. The system of claim 7, wherein the particular control valve is an air-to-close control valve.

11. The system of claim 7, wherein the received plurality of data samples are further associated with an air pressure.

12. The system of claim 11, further comprising:
  determining an obstruction reason based on the received plurality of data samples.

13. A non-transitory computer-readable medium storing executable instructions that when executed by the processor cause the processor to:
  determine a first subset of the plurality of data samples that are in a control zone associated with normal operation of the particular control valve, the first subset determination based on a first distribution among the plurality of data samples for the particular control valve;
  determine a second subset of the plurality of data samples for the particular control valve, the second subset being located in a low obstruction zone based on a second distribution among the plurality of data samples for the particular control valve, the second subset of the plurality of data samples having respective target setpoints less than their associated respective measured positions;
  indicate a first alert associated with a low obstruction;
  determine, via the processor, a third subset of the plurality of data samples for the particular control valve, the third subset being located in a high obstruction zone based on a third distribution among the plurality of data samples for the particular control valve, the second subset of the plurality of data samples having respective target setpoints less than their associated respective measured positions; and
  indicate a second alert associated with a high obstruction.

14. The medium of claim 13, wherein the control zone is associated with a position-setpoint error that is below a predetermined threshold and above zero.

15. The medium of claim 13, wherein the particular control valve is an air-to-open control valve.

16. The method of claim 13, wherein the particular control valve is an air-to-close control valve.

17. The medium of claim 13, further comprising:
  determining an obstruction reason based on the received plurality of data samples wherein the received plurality of data samples are further associated with an air pressure.

* * * * *